(12) United States Patent
Cochran et al.

(10) Patent No.: US 6,529,938 B1
(45) Date of Patent: Mar. 4, 2003

(54) METHOD, SYSTEM, AND PROGRAM FOR EXECUTING OPERATIONS ON A CLIENT IN A NETWORK ENVIRONMENT

(75) Inventors: Stephen Thomas Cochran, Austin, TX (US); Michael R. McNally, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/369,725

(22) Filed: Aug. 6, 1999

(51) Int. Cl.⁷ .............................................. C06F 15/173
(52) U.S. Cl. ...................................... 709/203; 709/223
(58) Field of Search ................................. 709/202, 203, 709/223, 225, 229; 717/11

(56) References Cited

U.S. PATENT DOCUMENTS

| | | | | |
|---|---|---|---|---|
| 5,561,769 A | * | 10/1996 | Kumber et al. | 709/202 |
| 5,797,128 A | | 8/1998 | Birnbaum | 707/5 |
| 5,987,611 A | * | 11/1999 | Freund | 713/201 |
| 6,065,055 A | * | 5/2000 | Hughes et al. | 709/229 |
| 6,073,214 A | * | 6/2000 | Fawcett | 711/133 |
| 6,209,032 B1 | * | 3/2001 | Dutcher et al. | 709/223 |
| 6,286,138 B1 | * | 9/2001 | Purcell | 717/11 |
| 6,304,892 B1 | * | 10/2001 | Bhoj et al. | 709/202 |
| 6,304,893 B1 | * | 10/2001 | Gish | 709/203 |

OTHER PUBLICATIONS

U.S. patent application Ser. No. 08/724,662, entitled "Load Balancing in a Distributed Computer Enterprise Environment", Oct. 1, 1996.

U.S. patent application Ser. No. 08/724,663, entitled "Scaleable and Extensible System Management Architecture With Dataless Endpoints", Oct. 1, 1996.

K.J. Maly, et al. "A Privilege Management System for a Secure Network", Department of Computer Science, Old Dominion University, Norfolk, VA, pp. 1–14, Jul. 1997.

Joseph Pasquale, "Knowledge–Based Distributed Systems Management", Jun. 1986, Report No. UCB/CSD 86/295, PROGRESS Report No. 86.1, Computer Sciences Division (EECS), University of California Berkley, Berkley, CA.

Jim Duffy, "CA Distributes Management and Integrates with HP", Network World, May 31, 1993, p. 17, p. 23.

Michael Bucken, "Do All Roads Lead to Unicenter?", Software Magazine, Apr. 1996.

Motive Communications, "At A Glance", pp. 1–2, May 1997.

Motive Communications, "The Motive System: First Software for Support Chain Automation", pp. 1–2, May 1998.

Motive Communications, "What is Support Chain Automation", pp. 1–2, Oct. 2, 1998.

Motive Communications, "SCA And Other Support Technologies", p. 1, Oct. 2, 1998.

\* cited by examiner

*Primary Examiner*—N. Le
*Assistant Examiner*—Walter Benson
(74) *Attorney, Agent, or Firm*—David W. Victor; Konrad Raynes Victor & Mann LLP

(57) ABSTRACT

Disclosed is a system, method, and program for executing operations on a client computer transmitted from a server over a network. A server operation is received indicating actions to perform on the client. A determination is made as to whether the requested operation is permitted according to a set of rules. The requested operation is executed on the client if there is no rule that prohibits the requested operation. The server is then notified that the requested action completed or that the requested action was not executed because of at least one rule prohibiting execution of the operation.

30 Claims, 5 Drawing Sheets

# METHOD, SYSTEM, AND PROGRAM FOR EXECUTING OPERATIONS ON A CLIENT IN A NETWORK ENVIRONMENT

BACKGROUND OF THE INVENTION

1. Field of the Invention

The present invention relates to a method, system, and program for executing operations on a client in a network environment and, in particular to an enterprise computing environment wherein ultimate control rests with a centralied server authority.

2. Description of the Related Art

In a client/server environment managed by a central authority, such as a corporate network administrator, the network administrator may perform various system management functions at the client machines used by employees, customers, or other users of corporate resources operating at client computers. Such network management functions may include providing program updates, monitoring and scanning files to determine the clients configuration, using the client as a console, etc. The Tivoli Systems Inc. (Tivoli) Tivoli Management Agent (TMA) provides a framework to allow a network administrator to perform network management operations such as software distribution, inventory scanning, user administration and distributed monitoring. The TMA software is installed on a client to allow the client to function as part of a larger computing enterprise managed by the network administrator. The TMA software executes a TMA daemon in the client, which is activated to provide the central administrator certain levels of control over client operations.

For instance, Tivoli Inventory allows the network administrator to automatically scan clients to collect hardware and software configuration information from client systems. Tivoli Inventory is used with Tivoli Software Distribution to determine the updates the clients need to conform to system configuration requirements and allow a technical support consultant to better diagnose problems at the client by reviewing the clients configuration. Tivoli Remote Control allows a network administrator complete real-time remote control and the ability to quickly establish connections, control desktop systems, and distribute applications executing across multiple clients.

There is a need in the art for an improved method, system, and program for performing enterprise wide operations.

SUMMARY OF THE PREFERRED EMBODIMENTS

Preferred embodiments disclose a system, method, and program for executing operations on a client computer transmitted from a server over a network. A server operation is received indicating actions to perform on the client. A determination is made as to whether the requested operation is permitted according to a set of rules. The requested operation is executed on the client if there is no rule that prohibits the requested operation. The server is then notified that the requested action completed or that the requested action was not executed because of one rule prohibiting execution of the operation.

In further embodiments, an override code associated with the requested operation is processed. The requested operation that is prohibited because of at least one rule is executed after processing the override code.

In still further embodiments, a client program executes a server program on the client that is transferred from the server to the client. The server program performs the steps of providing the requested operation to the client program and notifying the server of one of the results. The client program performs the steps of determining whether the requested operation is permitted according to the rules and executing the requested operation if there is no rule that prohibits the action.

Preferred embodiments provide a mechanism to allow client computers in a network/client environment a certain degree of control over the execution of network operations transmitted from a central server. With preferred embodiments, the centralized server authority is notified as to the client's execution of server initiated operations. Further, the server may provide an override code with the operation to cause the client to execute the server initiated operation notwithstanding the effort by the client to set a rule to block such operations. In this way, in an enterprise computing environment ultimately managed by a central authority, users at clients have a certain degree of control to block or limit server actions attempting to affect the client, with the caveat that the ultimate control and determiner of whether the client may block operations lies with the centralized server authority.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

Figure 1:
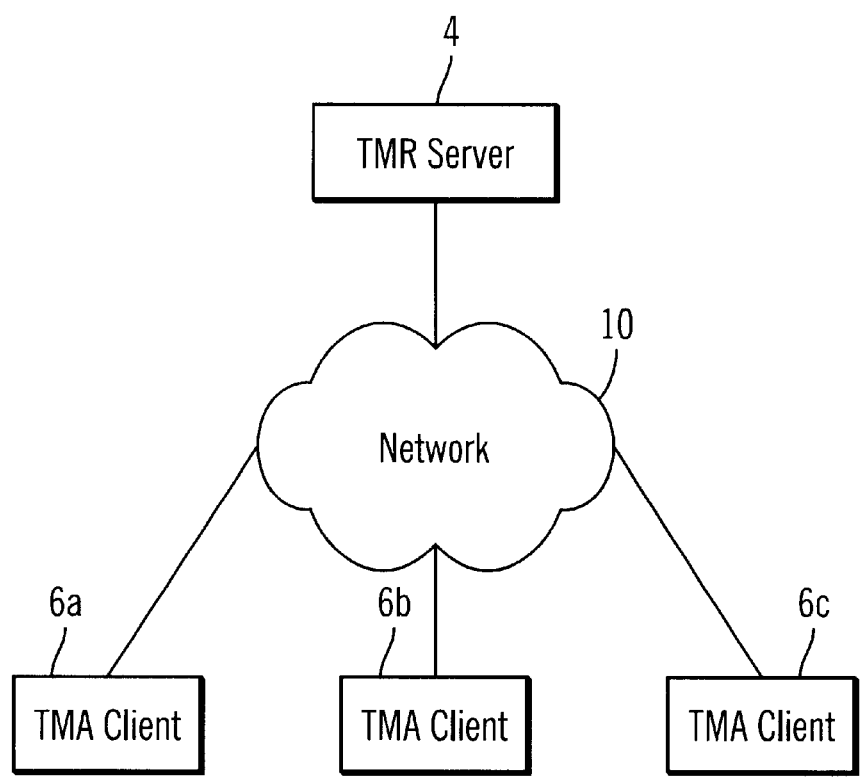
FIG. 1 illustrates a computing environment in which preferred embodiments in accordance with the present invention are implemented.

In the following description, reference is made to the accompanying drawings which form a part hereof, and which illustrate several embodiments of the present invention. It is understood that other embodiments may be utilized and structural and operational changes may be made without departing from the scope of the present invention.

Limitations In Current Enterprise Wide Computing Systems

Although large scale enterprise client/server environments may allow a centralized administrator to insure a certain level of control and commonality among all enterprise clients, certain server operations intended to be performed on all clients may produce certain undesirable results with respect to specific client machines. For instance, an enterprise wide removal of an application, or update, may interfere with a user at a client running the program that is subject to the enterprise wide action for a critical or important purpose. A user at a client may determine that certain enterprise wide operations, such as updates, inventory scans, etc., may adversely impact the user's computing. Current enterprise systems do not provide the user a certain level of control over such enterprise wide operations to allow client users to optimize their particular and unique computing situation.

Current firewall and security products allow a client connected to a network, such as the Internet, absolute control to determine whether to filter or block network requests and transmissions from other computers based on rules the client specified. For instance, ATGUARD** software from WRQ Inc. runs on a personal computer and monitors network traffic at the computer. The user may define a rule to cause the AtGuard software to intervene in network connections and block data requests from other computers in the network communicating over a network connection. Such firewall software is intended to respond to every request from another computer. In particular, such firewall software can, according to user specified rules, block images, block requests for field information and cookies to reduce the amount of targeted advertising received, block others from retrieving configuration information, and prevent the local web browser from running Java applets, JavaScript, and ActiveX controls to increase protection from potentially invasive programs.

**ATGUARD is a trademark of WRQ Inc.; WINDOWS and NT are registered trademarks of Microsoft Corporation; POWERPC, AIX, and RS/6000 are registered trademarks of International Business Machines Corporation; PENTIUM is a registered trademark of Intel Corporation; SPARCSTATION and SOLARIS OPERATING ENVIRONMENT are trademarks of Sun Microsystems, Inc.; TIVOLI is a trademark of Tivoli Systems Inc.

However, such current firewall programs are not suitable for an enterprise computing environment where it would be unacceptable to allow the client total control over network administrator communications and enterprise wide operations.

Thus, there is a need in the art to provide an improved program for performing network administrator functions on clients in an enterprise wide computing environments that would allow client users a certain degree of control over network administrator actions without necessarily usurping total control form the centralized authority.

Computing Environment

FIG. 1 illustrates a hardware and software environment in which preferred embodiments are implemented. A computing environment 2 may comprise thousands of resources, i.e., clients, that are geographically dispersed. These resources may be organized into coupled Tivoli Management Regions (TMR). A TMR server 4 includes the software components, libraries, binaries, data files, and graphical user interfaces (GUIs) needed to install and manage a TMR. The TMR server 4 may be comprised of a server system, such as an IBM RS/6000 OR POWERPC SYSTEMS running AIX, an INTEL PENTIUM system running WINDOWS NT, a SUN SPARCSTATION running the SOLARIS OPERATING ENVIRONMENT, etc.** In preferred embodiments, the TMR server includes the Tivoli Endpoint Manager that maintains information related to the endpoints, i.e., the clients, and to assign an endpoint gateway when the client 6a, b, c performs the initial login. The Tivoli endpoint gateway provides the primary interface between a set of clients 6a, b, c (endpoints) and the TMR server 4 and may be implemented in servers separate from the TMR server 4. TMA clients 6a, b, c may be any computer system known in the art that includes the Tivoli Management Agent (TMA) software that causes the computer to submit a certain degree of control to the TMR server 4 in order to function as part of an enterprise wide computing system. Further details of the Tivoli client/network system and the TMA components are described in the IBM publication "All About Tivoli Management Agents," IBM publication no. SG24-5134-00 (IBM Copyright, September, 1998), which publication is incorporated herein by reference in its entirety.

The network 10 provides communication between the TMR server 4 and the clients 6a, b, c. The network 10 may be a TCP/IP network, such as an Intranet, the Internet, World Wide Web, or any other network system known in the art, e.g., LAN, Ethernet, WAN, System Area Network (SAN), Token Ring, LocalTalk, TCP/IP, the Internet, etc. Alternatively, there may be separate and different networks between the TMR server 4 and clients 6a, b, c. In preferred embodiments, the network may interconnect thousands of enterprise resources. As discussed, the TMR server 4 may perform numerous network management functions with respect to the TMA clients 6a, b, c such as software inventory scanning, remote control of client 6a, b, c, security management, software distribution, etc. The TMA software enables the client 6a, b, c to be managed by the TMR server 4.

The TRM server 4 control applications are classified into either upeall or downcall applications. An upcall application involves placing a daemon or other program in the TMA clients 6a, b, c to perform various actions such as distributed monitoring and console applications. One such upcall daemon running in clients 6a, b, c is the sentry engine, which sends the TMR server 4 messages, displays pop-up messages, sends e-mail runs programs, etc. The messages the sentry engine daemon executing in the client 6a, b, c sends to the TMR server 4 are referred to as upcalls.

Downcall applications involve the TMR server 4 transmitting the downcall application to the TMA clients 6a, b, c. For instance, a software distribution program allows the TMR server 4 to distribute file packets to the TMA clients 6a, b, c. A TMA client 6a, b, c daemon program, referred to as the Lightweight Client Framework daemon (lcfd) receives a downcall application from the TMR server 4 to execute in the client 6a, b, c system. The executed downcall application communicates with the lcfd daemon to perform the TMR server 4 requested operations. For the software distribution program, the executing downcall application and lcfd daemon together apply file packets communicated with the downcall application to the TMA client 6a, b, c.

Providing User Client Control Over TMR Server Downcall Operations

Figure 2:
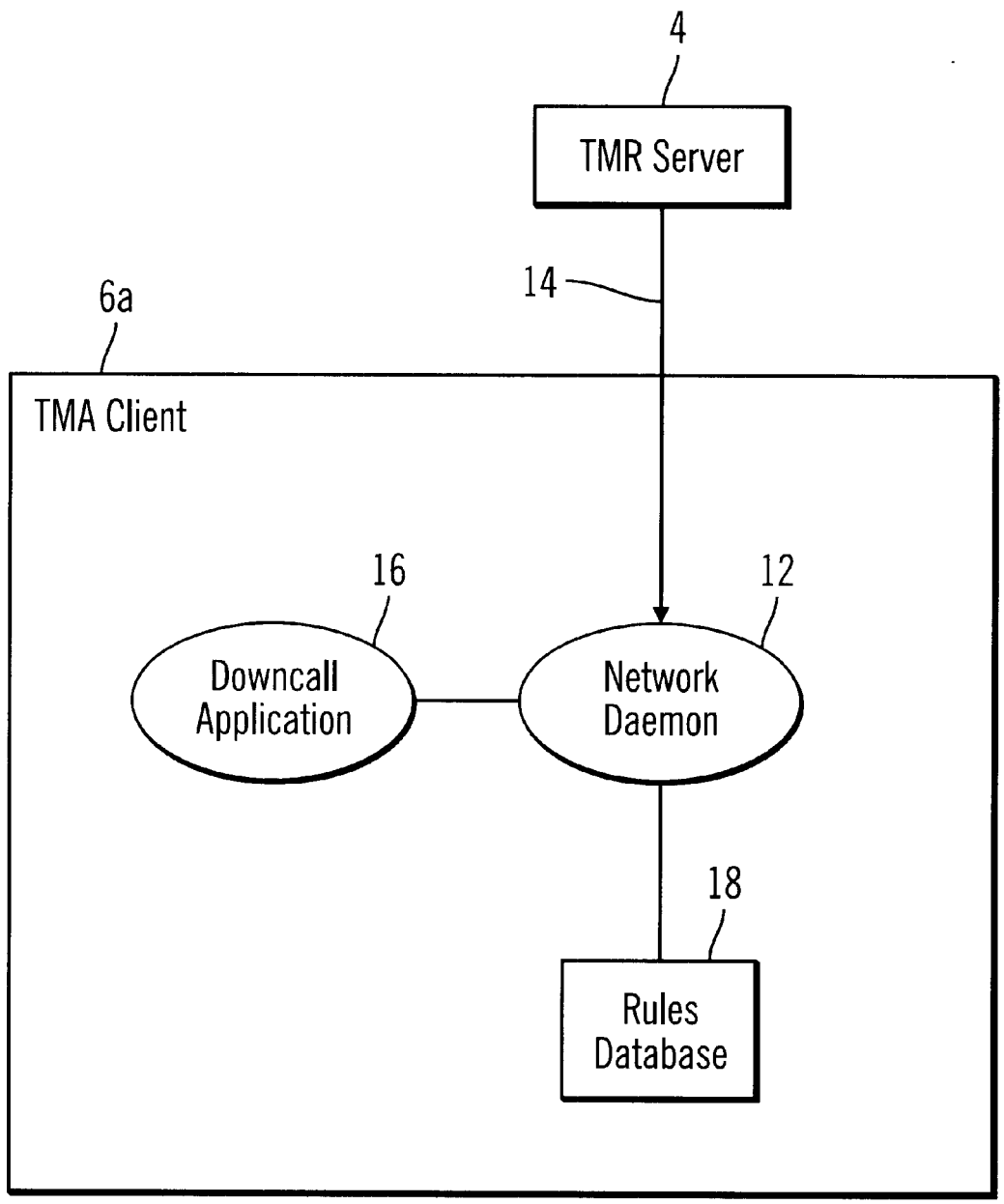
FIG. 2 illustrates software components within a client in a network environment in accordance with preferred embodiments of the present invention.

FIG. 2 illustrates further detail of the software components within a TMA client 6a, which may also be included in other clients in the enterprise such as clients 6b, c and numerous other resources. The TMA client 6a includes a network daemon 12 which allows the TMR server 4 to communicate downcalls 14 to the client 6a over the network. A network daemon 12 is a process that runs in the background of the client 6a operations and is designed to handle and process operations related to the downcall application sent from the TMR server 4. The network daemon 12 executes the downcall application 16 and communicates with the downcall application 16 to carry out the operations specified within the downcall application 16, e.g., software distribution, inventory scanning, etc. Also included in the client 6a is a rules database 18 that the network daemon 12 processes upon receiving requests from the downcall application 16 to determine whether to execute the downcall application's 16 request.

The user of the client 6a may specify through a GUI at the client 6a certain downcall operations that the user does not want performed on the client 6a. However, in preferred embodiments, the extent of the client's 6a power to block downcall operations is determined by the network administrator and is not solely the prerogative of a user at the client 6a. In this way, the rules database 18 can block downcall operations from proceeding. The rules database 18 may further provide more fine-grained control over downcall operations, such as specifying a time period during which the client 6a should block a specified downcall operation. For instance if a user at the client 6a is running a program as part of a customer presentation for a few hours, the client 6a would probably not want a downcall application 16 to impact the system by updating or removing the program the client 6a is running as part of the presentation. Further, performing inventory scanning and program management functions in general could interfere with the client 6a's performance during such presentations or critical operations. Inventory scanning involves the TMR server 4 sending downcalls to the clients 6a, b, c to determine client system configuration information and store such information on the client configurations in a database for network administrators to access and use to better monitor the clients 6a, b, c. In such case, the user may specify through the client 6a GUI that certain or all downcall operations are not to be performed at all, or just for a limited time period.

The rules database 18 can provide any level of detail over the control of downcall operations. For instance, the rules database 18 can specify a particular name of a downcall operation to monitor and then specify to block only a subset of operations performed by the downcall operation. For instance, the rules database 18 can indicate monitoring of the software distribution program and then indicate certain specific programs or files that the network daemon 12 should attempt to block. Further, the user of client 6a can specify to only shield such files for a limited period of time. Basically, the client 6a can attempt to manage downcall operations at any level of detail.

Because preferred embodiments are implemented in an enterprise client/server system where a network administrator is entitled to ultimate control over the clients 6a, b, c, the TMR server 4 may specify that the downcall application 16 should override any blocking efforts by the network daemon 12 during operation.

Figure 3A:
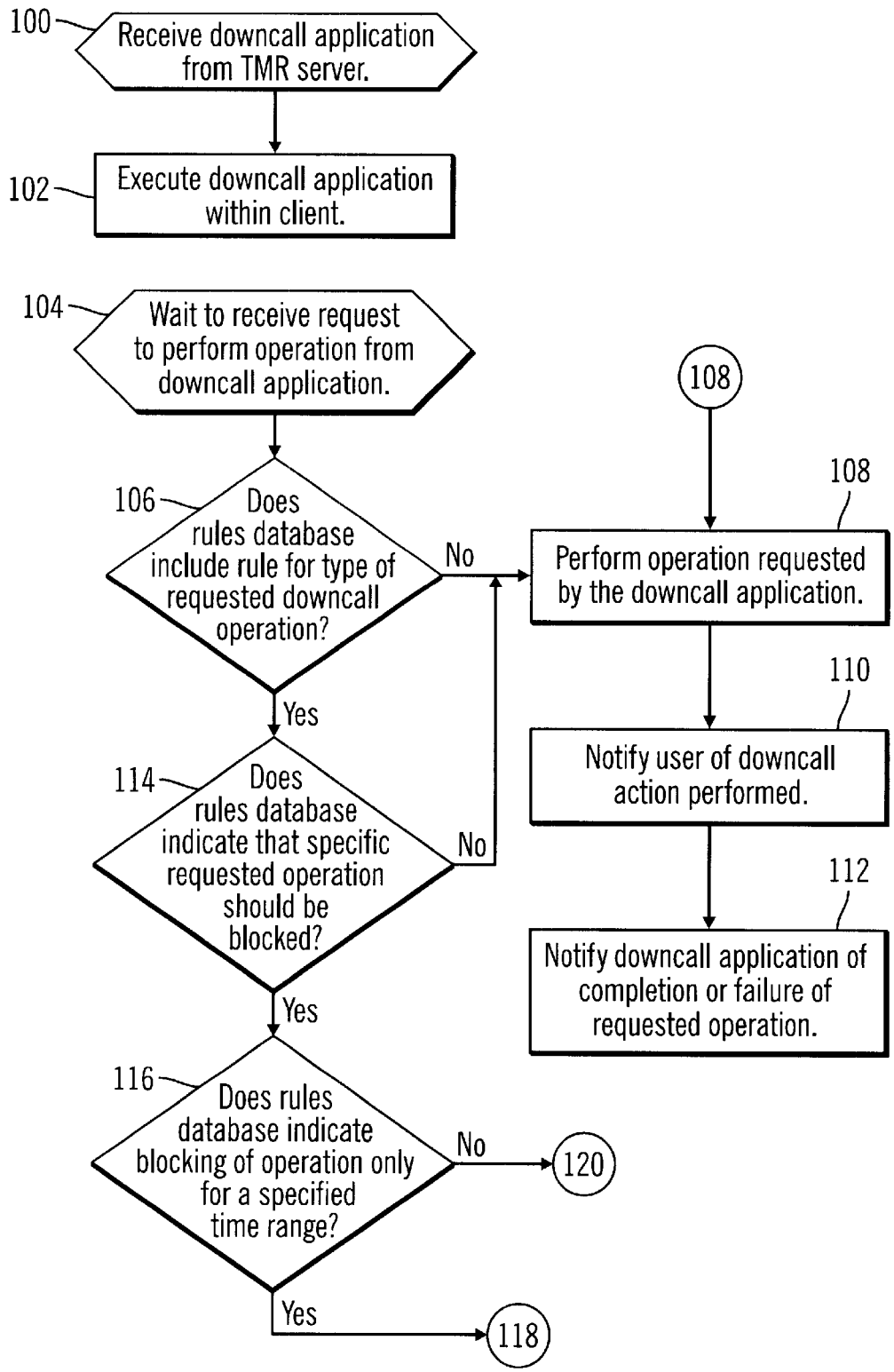
FIGS. 3a, b illustrates logic to allow a client to determine whether to perform program actions provided from a server program.
Figure 3B:
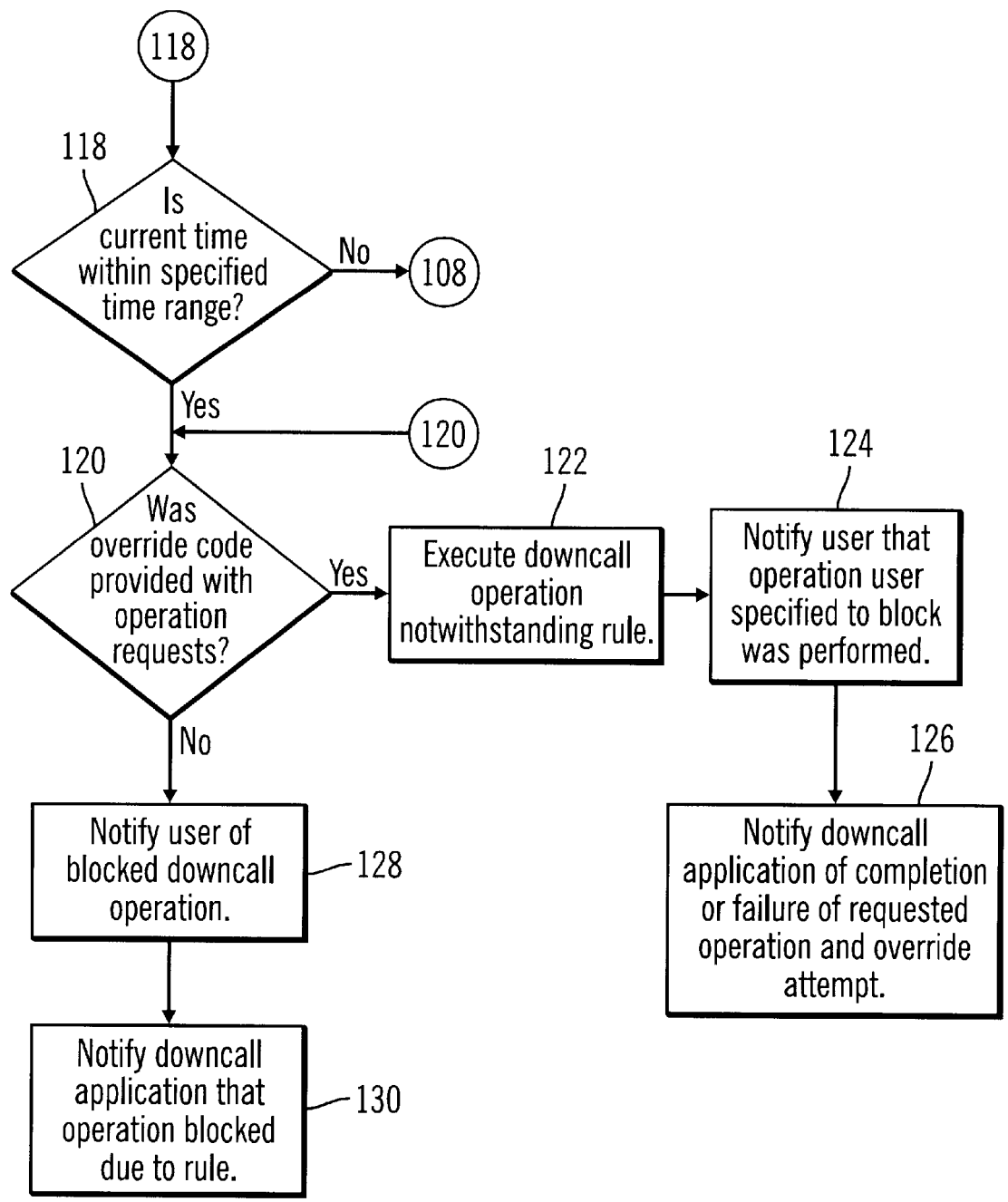

FIGS. 3a, b illustrate logic executed in the network daemon 12 to determine whether to carry out the operations specified by the downcall application 16. Control begins at block 100 with the network daemon 12 receiving a downcall application 16 from the TMR server 4 over the network. The network daemon 12 executes (at block 102) the downcall operation 16 within the client 6a and then waits (at block 104) to receive a request to perform an operation from the downcall application 16. Upon receiving a requested operation, the network daemon 12 determines (at block 106) whether the rules database 18 includes a rule for the type of downcall operation provided by the downcall application 16. If not, the network daemon 12 performs (at block 108) the operation requested by the downcall application 16. The network daemon 12 then notifies the user at client 6a (at block 110) of the downcall operation performed, e.g., software distribution, inventory scanning, console control, etc., and also notifies (at block 112) the downcall application 16 of the completion or failure of the requested operation.

If the rules database 18 includes an entry for the requested downcall operation, then the network daemon 12 determines (at block 114) whether the rules database 18 indicates that the specific requested downcall operation should be blocked. For instance, the rules database 18 may include a rule for software distribution, but only specify that the removal, updating and/or installation of specific application programs are to be blocked, not all applications. If the rules database 18 does not specify to block the specific requested operation, then control proceeds to block 108 to perform the requested operation. Otherwise, if the rule database 18 specifies blocking, then the network daemon 12 determines (at block 116) whether the rules database 18 indicates that the specific downcall operation is only to be blocked during a specific time period; operations performed outside of this range are allowed. If a time period is specified in the rules database 18 for the specific downcall operation, then the network daemon 12 checks (at block 118) the system clock to determine whether the current time is within the specified time range. If not, then the downcall operation is allowed and control proceeds to block 108 to perform the requested operation.

If the specified downcall operation is requested within the blocking time range, then the network daemon 12 determines (at block 120) whether the downcall application 16 provided an override code with the requested operation to cause the network daemon 12 to perform the requested operation notwithstanding any blocking rule set in the rules database 18. In preferred embodiments, the override code is provided with the requested operation. Alternatively, the network daemon 12 may request the downcall application 16 for an override code if there is a blocking rule. If no override code is provided, then the network daemon 12 notifies (at block 128) the user at the client 6a through a message displayed on a monitor attached to the client 6a of the downcall operation that was blocked according to the user specified rule. The network daemon 12 further notifies (at block 130) the downcall application 16 that the requested operation was blocked as a result of a user specified rule.

If an override code is provided, then the network daemon 12 (at block 122) executes the previously rejected downcall operation and then sends (at block 124) a notification message to the user at the client 6a indicating that a downcall operation that the user had requested to block was performed notwithstanding the specified blocking indicated in the rules database 18. The network daemon 12 then notifies (at block 126) the downcall application 16 of the completion or failure of the requested operation and that a rule rejecting the operation was disregarded due to the override code. By providing such information, the downcall application 16 may inform the TMR server, and network administrator, about a user's reliance and use of the blocking rule feature to determine the usefulness of such options in the enterprise.

Figure 4:
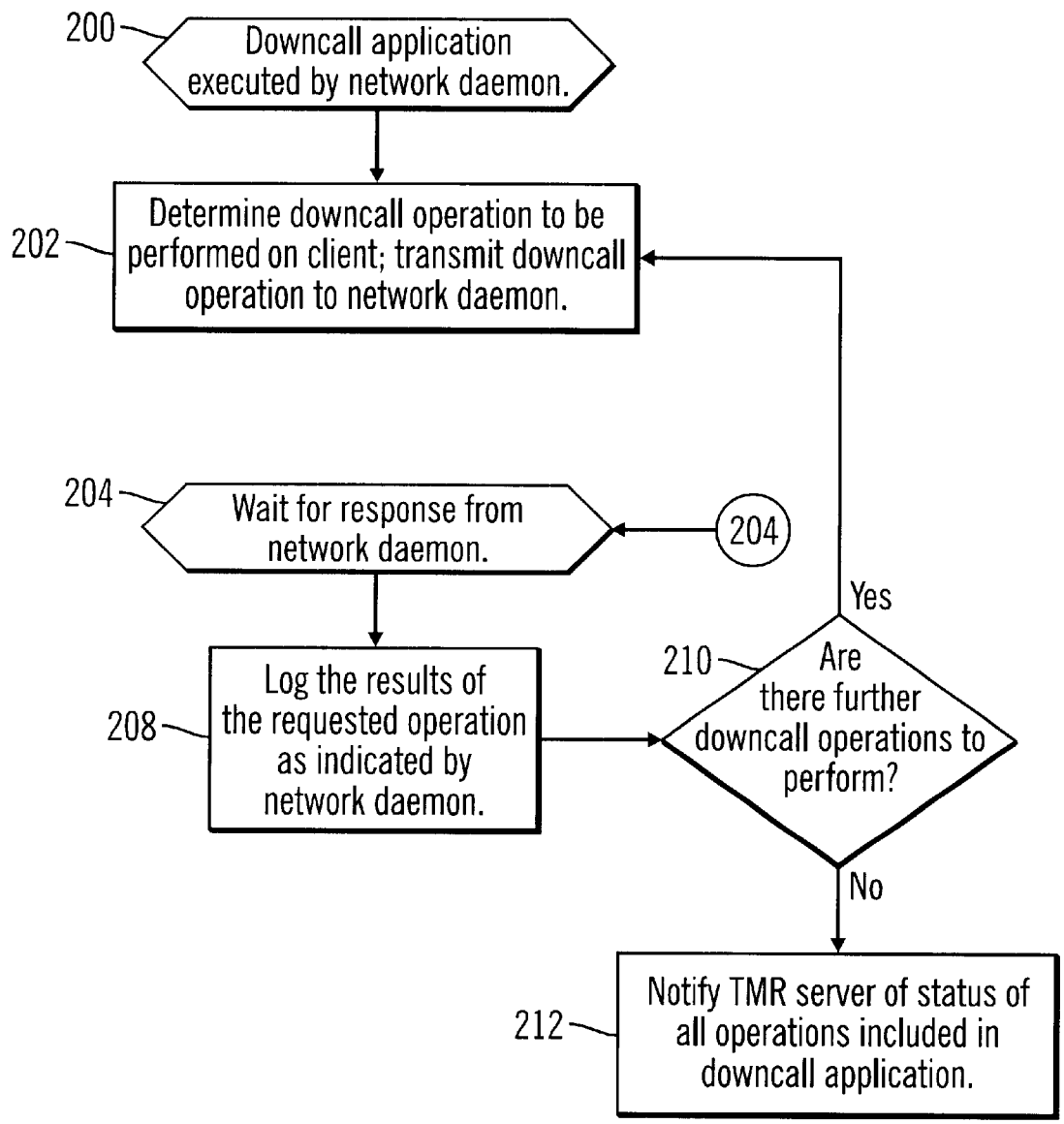
FIG. 4 illustrates logic implemented by the server program to determine how to respond to the client's processing of the program actions provided by the server program.

FIG. 4 illustrates logic executed in the downcall application 16 to request specific downcall operations, such as software distribution, inventory scanning, configuration setting, etc, and handle responses from the network daemon 12. Control begins at block 200 with the network daemon 12 executing the downcall application 16 within the client 6a. The downcall application 16 determines (at block 202) a downcall operation to perform on the client 6a and transmits the downcall operation to the network daemon 12 to execute on the client 6a. At block 204, the downcall application 16 waits for a response from the network daemon 12. Upon receiving the response, the downcall application 16 logs the result of the operation as indicated by the network daemon 12. Such logged result may indicate that the operation was attempted but did not complete due to some system failure or failed operation, that the operation was not attempted due to a blocking rule, that the operation completed, and/or that the operation was attempted after the override code was used to override a blocking rule. The downcall application 16 then determines (at block 210) whether there are further downcall operations to perform, specified within the downcall application's 16 code. If so, the downcall application 16 returns to block 202 to process the next downcall application 16. Otherwise, upon completion of the last downcall operation, the downcall application notifies (at block 212) the TMR server 4 over the network of the status of all operations included in the downcall application 16 as indicated in the log of the results, e.g., whether the operation completed, was blocked and not overridden, was completed after the override was presented, failed to complete due to system failure, etc.

In preferred embodiments steps 100 and 104 in FIG. 3a and steps 200 and 204 in FIG. 4 may be performed asynchronously of each other, thereby allowing the network daemon and downcall application to concurrently process multiple operations.

With preferred embodiments, a certain degree of control over how a network administrator may monitor and alter the configuration of the client computers 6a, b, c is devolved to the client 6a, b, c to allow the client 6a, b, c to specify in a rules database 18 that certain network operations are to be blocked. In preferred embodiments, the user is only allowed to block a certain set of network operations, and not all operations. Further, the network administrator may provide an override code with the downcall operations to override any attempt of the client 6a, b, c to block the operation. Thus, preferred embodiments are suitable for controlled client/server environments, such as an enterprise or corporate environment, where a clients are ultimately controlled entities that operate to further the enterprise goals, not individualistic users. In such systems, the clients 6a, b, c relinquish a certain level of control to the network administrator to insure that clients operate effectively as part of a larger enterprise. The preferred embodiments allow the network administrators to provide the clients 6a, b, c some degree of control to optimize their performance and tailor operations for their specific needs. However, at all times, the network administrator can override or limit a client's 6a, b, c ability to interfere or block the TMR server 4 client management, monitoring, and control operations.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The tern "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were descried as implemented with Tivoli client/server software. However, the client and servers may be implemented using any vendor client/server architecture known in the art.

Preferred embodiments were described with respect to an enterprise system in which there are perhaps thousands of resources managed by one or more servers. However, in alternative embodiments, the preferred embodiments may be utilized with client/server environments including far fewer network resources.

Preferred embodiments were described with respect to a system in which the network administrator or server performs operations on the client 6a, b, c by executing a downcall application inside the client managed by a client daemon. However, those skilled in the art will appreciate that there are many ways the server can communicate commands and operations to the client, such as sending the commands over the network to cause the client to perform specific actions, thereby avoiding the need to have a separate program executing on the client. The advantage of the downcall application is that it distributes processing to the client, thereby making more resources available to the server.

In preferred embodiments, a daemon program interacted with the downcall application to perform actions with respect to requests from the downcall operation. In alternative embodiments, the functions performed by the network daemon 12 may be performed by any type of program running on the computer, including daemon programs and/or application programs.

Preferred embodiments were described with respect to a private centralized authority, such as a corporation or other commercial interest managing the network to accomplish a commercial purpose. However, the preferred embodiments could be applied to centralized managed systems that are not especially commercial in nature, such as governments and other entities that seek to exercise control over network users.

In summary, the present invention provides a system, method, and program for executing operations on a client computer transmitted from a server over a network. A server operation is received indicating actions to perform on the client. A determination is made as to whether the requested operation is permitted according to a set of rules. The requested operation is executed on the client if there is no rule that prohibits the requested operation. The server is then notified that the requested action completed or that the requested action was not executed because of one rule prohibiting execution of the operation. The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for executing operations on a client computer transmitted from a server over a network, comprising:

receiving a requested operation from the server indicating actions to perform on the client;

determining whether the requested operation is permitted according to a set of rules;

executing the requested operation to perform actions on the client if there is no rule prohibiting the requested operation;

determining whether the server submitted an override code with the requested operation, wherein the override code indicates to disregard any rule prohibiting the requested operation with which the override code is submitted;

executing the requested operation that is prohibited by at least one rule if the override code is provided; and after processing the requested operation, transmitting a notification to the server of the results of the processing of the requested operation, wherein the transmitted notification indicates (i) that the requested operation completed or (ii) that the requested operation was not executed because of one rule prohibiting execution of the operation if no override code was submitted with the requested operation.

2. The method of claim 1, further comprising notifying the server that the requested operation was performed after the presentation of the override message.

3. The method of claim 1, wherein the override code is included with the requested operation.

4. The method of claim 1, further comprising executing, with a client program a server program on the client transferred from the server to the client, wherein the server program performs the steps of providing the requested operation to the client program and notifying the server of one of the results, and wherein the client program performs the steps of determining whether the requested operation is permitted according to the set of rules and executing the requested operation if there is no rule that prohibits the action.

5. The method of claim 4, further comprising:

returning, with the client program, indication to the server program that the requested operation will not be performed if at least one rule does not permit the action; and returning, with the client program, indication to the server program that the requested operation was executed if there is no rule prohibiting the action, wherein the server program processes the indications from the client program to generate the notification to the server of one of the results.

6. The method of claim 1, wherein a program executing within the client performs the step of notifying the server of one of the results over the network.

7. The method of claim 1, further comprising:

determining whether the rules indicate that the requested operation is to be blocked during a specified time period; and determining whether a current time falls within the specified time period, wherein the requested operation is not executed if the current time is within the specified time and wherein the requested operation is executed if the current time is not within the specified time.

8. The method of claim 1, wherein the requested operation is an operation that is a member of the set of operations consisting of: program removal, program installation, program updating, determining client configurations, and controlling client operations.

9. The method of claim 1, wherein the set of rules are created by a client user.

10. The method of claim 1, wherein there are a plurality of client computers performing the steps of receiving server operations, determining whether the requested operation is permitted, executing the requested operation and notifying the server of one of the results, and wherein each client user is capable of separately configuring the set of rules for the client computer.

11. A system for executing operations in a network system including a network and a server, comprising:

a client computer;

a network for allowing the client computer to communicate with the server;

program logic, executed within the client, comprising:

(i) means for receiving a requested operation communicated from the server over the network indicating actions to perform on the client;

(ii) means for determining whether the requested operation is permitted according to a set of rules;

(iii) means for executing the requested operation to perform actions on the client if there is no rule prohibiting the requested operation;

(iv) means for determining whether the server submitted an override code with the requested operation, wherein the override code indicates to disregard any rule prohibiting the requested operation with which the override code is submitted;

(v) means for executing the requested operation that is prohibited by at least one rule if the override code is provided; and (iv) means for transmitting, after processing the requested operation, a notification to the server over the network of the results of the processing of the requested operation, wherein the transmitted notification indicates:

(a) that the requested operation completed or (b) that requested operation was not executed because of one rule prohibiting execution of the operation if no override code was submitted with the requested operation.

12. The system of claim 11, wherein the program logic further comprises means for notifying the server over the network that the requested operation was performed after the presentation of the override message.

13. The system of claim 11, wherein the override code is included with the requested operation.

14. The system of claim 11, herein the program logic comprises a client program and a server program, wherein the client program includes logic for receiving the server program from the server over the network and executing the server program on the client, wherein the client program performs the steps of determining whether the requested operation is permitted according to the set of rules and executing the requested operation if there is no rule that prohibits the action, and wherein the server program performs the steps of providing the requested operation to the client program and notifying the server of one of the results over the network.

15. The system of claim 14, wherein the client program further comprises:

logic for indicating to the server program that the requested operation will not be performed if at least one rule does not permit the action; and logic for indicating to the server program that the requested operation was executed if there is no rule prohibiting the action, wherein the server program processes the indications from the client program to generate the notification to the server of one of the results.

16. The system of claim 14, wherein the client program is a daemon executing within the client.

17. The system of claim 11, wherein the program logic further comprises:

means for determining whether the rules indicate that the requested operation is to be blocked during a specified time period; and means for determining whether a current time falls within the specified time period, wherein the requested operation is not executed if the current time is within the specified time and wherein the requested operation is executed if the current time is not within the specified time.

18. The system of claim 11, wherein the requested operation is an operation that is a member of the set of operations consisting of: program removal, program installation, program updating, determining client configurations, and controlling client operations.

19. The system of claim 11, wherein the set of rules are created by a client user.

20. The system of claim 11, further comprising:
a plurality of client computers each executing the program logic to perform the steps of receiving server operations, determining whether the requested operation is permitted, executing the requested operation and notifying the server of one of the results, wherein each client user is capable of separately configuring the set of rules for the client computer.

21. An article of manufacture for use in programming a client computer to execute operations transmitted from a server over a network, the article of manufacture comprising computer usable media including at least one computer program embedded therein that causes the client computer to perform:
receiving a requested operation from the server indicating actions to perform on the client;
determining whether the requested operation is permitted according to a set of rules;
executing the requested operation to perform actions on the client if there is no rule prohibiting the requested operation;
determining whether the server submitted an override code with the requested operation, wherein the override code indicates to disregard any rule prohibiting the requested operation with which the override code is submitted;
executing the requested operation that is prohibited by at least one rule if the override code is provided; and
after processing the requested operation, transmitting a notification to the server of the results of the processing of the requested operation, wherein the transmitted notification indicates: (i) that the requested operation completed or (ii) that requested operation was not executed because of one rule prohibiting execution of the operation if no override code was submitted with the requested operation.

22. The article of manufacture of claim 21, further comprising notifying the server that the requested operation was performed after the presentation of the override message.

23. The article of manufacture of claim 21, wherein the override code is included with the requested operation.

24. The article of manufacture of claim 21, wherein the computer programs embedded in the computer usable media include a client program and a server program, wherein the client program causes the client computer to perform the steps of determining whether the requested operation is permitted according to the set of rules and executing the requested operation if there is no rule that prohibits the action, wherein the client program further performs the steps of receiving the server program from the server over the network and executing the server program on the client, and wherein the server program performs the steps of providing the requested operation to the client program and notifying the server of one of the results over the network.

25. The article of manufacture of claim 24, wherein the client program further causes the client computer to perform:
returning indication to the server program that the requested operation will not be performed if at least one rule does not permit the action; and
returning indication to the server program that the requested operation was executed if there is no rule prohibiting the action, wherein the server program processes the indications from the client program to generate the notification to the server of one of the results.

26. The article of manufacture of claim 24, wherein the client program is a daemon executing within the client computer.

27. The article of manufacture of claim 21, further comprising:
determining whether the rules indicate that the requested operation is to be blocked during a specified time period; and
determining whether a current time falls within the specified time period, wherein the requested operation is not executed if the current time is within the specified time and wherein the requested operation is executed if the current time is not within the specified time.

28. The article of manufacture of claim 21, wherein the requested operation is an operation that is a member of the set of operations consisting of: program removal, program installation, program updating, determining client configurations, and controlling client operations.

29. The article of manufacture of claim 21, wherein the set of rules are created by a client user.

30. The article of manufacture of claim 21, wherein there are a plurality of client computers, and wherein the at least one computer program is executed by each client program to perform the steps of receiving server operations, determining whether the requested operation is permitted, executing the requested operation and notifying the server of one of the results, and wherein each client user is capable of separately configuring the set of rules for the client computer.

* * * * *

UNITED STATES PATENT AND TRADEMARK OFFICE
CERTIFICATE OF CORRECTION

PATENT NO. : 6,529,938 B1
DATED : March 4, 2003
INVENTOR(S) : Stephen Thomas Cochran and Michael R. McNally It is certified that error appears in the above-identified patent and that said Letters Patent is hereby corrected as shown below:

<u>Column 9,</u>
Line 18, after "from the server" insert -- , --.

Signed and Sealed this

Thirtieth Day of December, 2003

JAMES E. ROGAN
*Director of the United States Patent and Trademark Office*